June 9, 1953
D. J. SIKORRA
2,641,738
ELECTRIC REGULATOR RESPONSIVE TO
PHASE DIFFERENCE OF TWO CURRENTS
Filed Jan. 20, 1951
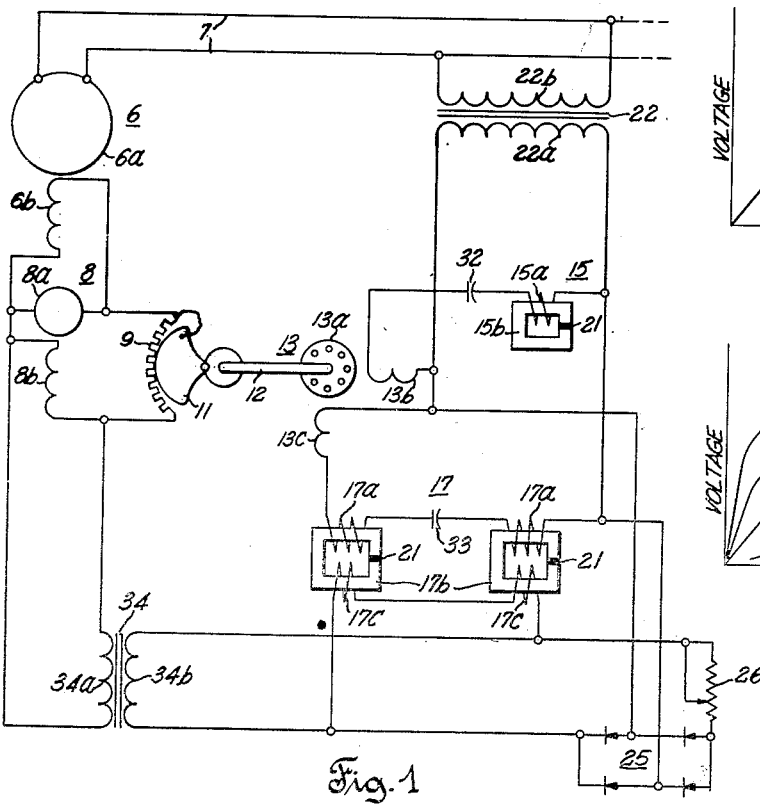
Fig. 1
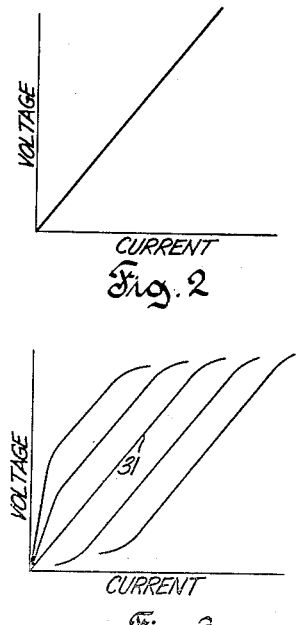
Fig. 2
Fig. 3
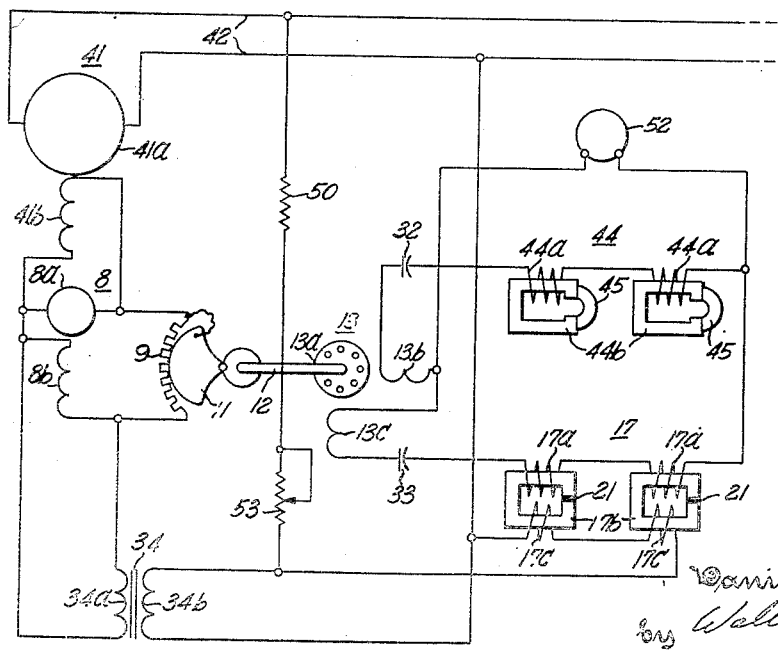
Fig. 4
Inventor
Daniel J. Sikorra
by Walter J. Madden Jr.
Attorney Patented June 9, 1953

2,641,738

UNITED STATES PATENT OFFICE 2,641,738

ELECTRIC REGULATOR RESPONSIVE TO PHASE DIFFERENCE OF TWO CURRENTS

Daniel J. Sikorra, Milwaukee, Wis., assignor to Allis-Chalmers Manufacturing Company, Milwaukee, Wis.

Application January 20, 1951, Serial No. 207,011

9 Claims. (Cl. 323—66)

This invention relates in general to regulating systems and in particular to electrically operated regulators for such systems.

Regulators embodying alternating current torque motors having field coils energized by a measure of a quantity to be regulated are well known. In most of such regulators, the torque produced by the field coils is balanced against the torque of a mechanical reference, such as reference and auxiliary springs, so that variations in the quantity from a desired value produce a rotational torque in the motor to move the regulator and return the quantity to the desired value.

Such systems have the disadvantage that the impedance of the motor field circuit varies with variations in the frequency of the applied voltage, so that the operation of the regulator is affected by frequency variations. An additional disadvantage of such regulators is that in case of failure of the alternating current supply to the motor coils, the mechanical reference moves the regulator to an extreme position, causing unsafe operation of the regulator. A further disadvantage of such regulators is that heating of the motor field coils varies the resistance of the field coils, thereby altering the operation of the regulator unless some type of compensation is provided.

These disadvantages may be overcome by utilizing a regulator embodying an alternating current torque motor which is insensitive to variations in the frequency of the applied voltage and which is operative to regulate either alternating or unidirectional quantities.

It is therefore an object of this invention to provide an electromechanical regulator which requires no mechanical reference for its operation.

It is a further object of the present invention to provide an improved electric regulator which is unaffected by variations of the frequency of the alternating currents flowing in the circuits thereof.

It is an additional object of the present invention to provide an improved electric regulator which is operative to regulate either alternating or unidirectional quantities.

It is a further object of the present invention to provide an improved electric regulator which is insensitive to temperature variations.

It is an additional object of this invention to provide an electric regulator utilizing the same means for amplifying a damping signal and for sensing deviations in the regulated quantity.

Objects and advantages other than those set forth above will be apparent from the following description when read in connection with the accompanying drawing, in which:

Fig. 1 diagrammatically illustrates the preferred embodiment of the invention;

Figs. 2 and 3 are curves illustrating the operation of component parts of the embodiment shown in Fig. 1, and Fig. 4 diagrammatically illustrates an alternate embodiment of the present invention.

Referring to Fig. 1, one embodiment of the invention is shown applied to the regulation of an operating characteristic of an alternating current generator 6 supplying a load circuit represented by conductors 7. Generator 6 is provided with an armature 6a connected to conductors 7 and a field winding 6b connected to a suitable controllable source of direct current, such as the armature 8a of an exciter generator 8. Exciter 8 is provided with a field winding 8b, the energization of which is controlled by the regulator of this invention.

Field winding 8b is preferably connected across the armature 8a in series with an adjustable resistor 9. Resistor 9 has associated therewith a rocking contact sector 11 for varying the portion of resistor 9 which is connected in series with winding 8b. Sector 11 is actuated through a shaft 12 by the rotor 13a of a torque induction motor 13. Motor 13 is provided with a pair of mechanically displaced duplicate field coils 13b, 13c to control the torque of the motor. Coil 13b is serially connected with the winding 15a of a linear inductive reactor 15 having a magnetic core 15b to form a first circuit, and coil 13c is serially connected with the reactance winding 17a of a saturable reactor 17 to form a second circuit. Reactor 17 is also provided with a pair of saturable cores 17b and a control or saturating winding 17c. Cores 15b, 17b are each provided with an air gap of any suitable known form, which may be defined by shims 21 of nonmagnetic material inserted in the cores.

The first and second circuits described above have substantial resistance in addition to reactance and are energized in parallel with each other from a suitable alternating current source, such as the secondary winding 22a of a transformer 22 having its primary winding 22b connected to conductors 7. Owing to the inductance of coils 13b, 13c, winding 15a and winding 17a, the currents through these elements will lag the applied voltage by an appreciable angle. To improve the power factor of the circuits, equal capacitors 32, 33 may be connected as shown in Fig. 1.

Control winding 17c has impressed thereon a unidirectional voltage proportional to the magnitude of the operating characteristic being regulated. If it is desired to maintain the voltage of armature 6a substantially constant at a predetermined value, winding 17c may be supplied with a voltage proportional to the voltage of armature 6a through a full wave rectifier 25 having its alternating current terminals connected across secondary winding 22a and having its direct current terminals connected across winding 17c in series with an adjustable resistor 26. The saturation of cores 17b and the reactance of winding 17a therefore vary in response to variations in the magnitude of the voltage of armature 6a from the predetermined value.

The volt-ampere characteristic of reactor 15 may be represented by the straight line of Fig. 2, while the volt-ampere characteristics of reactor 17 for different fixed values of direct current traversing winding 17c may be represented by the family of curves of Fig. 3. Fig. 3 shows that by suitable adjustment of the current through winding 17c to produce a volt-ampere characteristic for reactor 17 as shown by curve 31 of Fig. 3, the volt-ampere characteristics of reactors 15 and 17 will be substantially identical over a wide range of voltage and current.

A damping transformer 34 having a primary winding 34a connected across field winding 8b and a secondary winding 34b connected across winding 17c may be provided to impress on winding 17c a stabilizing voltage proportional to the rate of change of the voltage of winding 8b.

In operation of the system, assuming that machines 6 and 8 are operating, the voltage of armature 6a has a magnitude determined by the energization of field winding 6b, which energization is in turn dependent upon the energization of field winding 8b controlled by the amount of resistor 9 connected in series therewith. Assuming that the voltage of armature 6a has the desired value, secondary winding 22a impresses on the first and second circuits and on rectifier 25 a voltage proportional to the voltage of armature 6a to produce a predetermined reactance in winding 17a. Resistor 26 is preferably so adjusted that when the voltage of armature 6a has the desired value, reactor 17 has the volt-ampere characteristic shown by curve 31, substantially identical to the volt-ampere characteristic of reactor 15. Under these conditions, assuming field coils 13b, 13c to have equal impedances, equal currents flow through the first and second field coil circuits and the currents are also in phase with each other. Since the torque of motor 13 is proportional to the product of the currents through coils 13b, 13c multiplied by the sine of the phase displacement angle between the currents in coils 13b, 13c, the torque of motor 13 under these conditions is zero. Motor 13 therefore maintains sector 11 in its present position to maintain the voltage of armature 6a at the desired value.

If the voltage of armature 6a increases above the desired value, the voltage impressed on rectifier 25 by secondary winding 22a increases to increase the saturation of cores 17b and thereby reduce the reactance of winding 17a. As the circuit of coil 13c has substantial effective resistance, a reduction in the reactance of winding 17a causes the current through coil 13c and winding 17a to become less lagging than before, thereby producing a phase difference between the currents in the first and second circuits to produce a rotational torque in motor 13. Motor 13 thereupon rotates to move sector 11 through shaft 12 to increase the amount of resistor 9 connected in series with field winding 8b. This action reduces the voltage of armature 8a to thereby reduce the energization of field winding 6b to return the voltage of armature 6a to the desired value. When the voltage of armature 6a has returned to the desired value, the second circuit again has the volt-ampere characteristic of curve 31 to produce zero torque in motor 13, causing sector 11 to remain in its new position to maintain the voltage of armature 6a at the desired value. During the above described operation, transformer 34 impresses on winding 17c a stabilizing voltage proportional to the rate of change of the voltage across field winding 8b, which stabilizing voltage is considerably amplified by reactor 17 to prevent hunting of the regulator. Thus, reactor 17 acts to both sense deviations in the regulated quantity and to amplify a damping signal to the regulator.

If the voltage of armature 6a decreases below the desired value, the action of the regulator to return the voltage to the desired value is the reverse of that described above.

If the speed of machine 6 changes, the frequency of the voltage of armature 6a and conductors 7 changes to vary the reactances of windings 15a, 17a. However, since windings 15a, 17a have substantially identical volt-ampere characteristics when the voltage of armature 6a is normal, changes in the frequency of the voltage of armature 6a produce equal changes in the reactances of windings 15a, 17a, so that the effect of the frequency changes on the regulator is negligible. The volt-ampere characteristics of reactors 15 and 17 therefore undergo equal predetermined changes in response to variations in the frequency of the applied voltage to provide a frequency insensitive regulator. After the regulator has been operating for some time, the heating of field coils 13b, 13c produces changes in the resistances of the field coils to vary the currents through the first and second circuits. However, these resistance changes are without effect on the regulator, since the first and second circuits are electrically symmetrical, causing the two circuit currents to remain in phase with each other when the regulated quantity has the desired value.

Fig. 4 illustrates an alternate embodiment of the invention applied to the regulation of a unidirectional quantity. In the embodiment of Fig. 4, the regulator is utilized to control the voltage of the armature 41a of a direct current generator 41 supplying a load circuit 42. Generator 41 is provided with a field winding 41b supplied from armature 8a of exciter 8, and resistor 9 is connected in circuit with field winding 8b as in Fig. 1. Reactor 15 in the first circuit of Fig. 1 is replaced in Fig. 4 by a reactor 44, provided with a reactance winding 44a. Reactor 44 is also provided with suitable bias means to bias cores 44b to a predetermined fixed reference level, such as permanent magnets 45 associated with cores 44b.

Coil 13b is connected in series with reactance winding 44a and a capacitor 32 to form a first circuit, and coil 13c is connected in series with capacitor 33 and winding 17a to form a second circuit. These circuits are energized in parallel with each other from a suitable source of alternating current, represented by an alternator 52. Control winding 17c is provided with a measure of the regulated quantity by being connected across circuit 42 in circuit with a fixed resistor 50 and an adjustable resistor 53 to vary the saturation of cores 17b in response to variations in the voltage of armature 41a and circuit 42.

Damping transformer 34 has its primary winding 34a connected across field winding 8b and has its secondary winding 34b connected across winding 17c to impress on winding 17c a stabilizing voltage proportional to the rate of change of the voltage of winding 8b.

Permanent magnets 45 in cores 44b produce a fixed reference magnetic bias source for cores 44b. Magnets 45 also act as small air gaps in cores 44b, so that reactor 44 has a volt-ampere characteristic substantially identical to curve 31 for one strength of magnets 45. Resistor 53 is so adjusted that when the voltage of armature 41a has the desired value reactor 17 also has the volt-ampere characteristic represented by curve 31, so that windings 17a, 44a have equal reactances when the voltage of armature 41a has the desired value. Under these conditions the currents through coils 13b, 13c are equal and in phase so that the torque of motor 13 is zero to maintain sector 11 in its existing position to keep the voltage of armature 41a at the desired value.

If the voltage of armature 41a increases above the desired value, the voltage impressed on winding 17c increases to decrease the reactance of winding 17a. The current through winding 17a and coil 13c thereupon becomes less lagging than the current through winding 44a and coil 13b, producing a torque in motor 13 to rotate sector 11. Sector 11 increases the amount of resistor 9 connected in series with field winding 8b to reduce the voltage of armature 8a and return the voltage of armature 41a to the desired value. During the above described operation, the stabilizing voltage impressed on winding 17c by winding 34b is amplified by reactor 17 to prevent hunting of the system.

If the voltage of armature 41a decreases below the desired value, the action of the regulator to return the voltage to the desired value is the reverse of that described above.

It will be noted that the strength of magnets 45 and the adjustment of resistor 53 may be varied to vary the volt-ampere characteristics of reactors 17, 44 so that the reactors operate on any of the volt-ampere characteristics of Fig. 3. If the volt-ampere characteristics of reactors 17, 44 are adjusted so that they are substantially identical, the regulator will be insensitive to variations in frequency or magnitude of the voltage of alternator 52, since such variations will produce equal effects on windings 17a, 44a.

Although but two embodiments of the present invention have been illustrated and described, it will be apparent to those skilled in the art that various changes and modifications may be made therein without departing from the spirit of the invention as set forth in the appended claims.

In particular, the volt-ampere characteristics of the first and second circuits need not be coincident as long as the two characteristics have the same shape and the first and second circuits operate at the same power factor when the regulated quantity has the desired value. That is, the magnitudes of the currents through the first and second circuits may have any relation to each other as long as the currents in the two circuits are in phase with each other when the regulated quantity has the desired value. Also, it will be apparent that the embodiments of Figs. 1 and 4 are equally effective to regulate either alternating or unidirectional quantities.

It is claimed and desired to secure by Letters Patent:

1. In a system for maintaining a quantity substantially constant at a predetermined value, the combination of regulating means including a motor for controlling the magnitude of said quantity, said motor comprising a first field coil and a second field coil, a linear reactor connected in series with said first field coil to form a first circuit, a saturable reactor having a reactance winding and a control winding, means connecting said reactance winding in series with said second field coil to form a second circuit, a source of alternating current for energizing said first and second circuits, the relative phase of the currents in said first and second circuits determining the direction of rotation of said motor, and means connected to said control winding for impressing on said control winding a unidirectional voltage proportional to the magnitude of said quantity to cause the saturation of said saturable reactor to vary in response to variations in the magnitude of said quantity, whereby said motor rotates in the one or the other direction in response to variations in said quantity from said predetermined value to maintain said quantity substantially constant at said predetermined value.

2. In a system for maintaining a quantity constant, the combination of regulating means including a motor for controlling the magnitude of said quantity, said motor comprising a first field coil and a second field coil, a linear reactor, a first capacitor, means connecting said first field coil, said first capacitor and said reactor in series to form a first circuit, a saturable reactor having a reactance winding and a control winding, a second capacitor, means connecting said second field coil, said second capacitor and said reactance winding in series to form a second circuit, a source of alternating current for energizing said first and second circuits, the relative phase of the currents in said first and second circuits determining the direction of rotation of said motor, and means for impressing on said control winding a unidirectional voltage proportional to the magnitude of said quantity to cause said motor to rotate in a direction to maintain said quantity substantially constant.

3. In a system for maintaining a quantity substantially constant at a predetermined value, the combination of regulating means including a motor for controlling the magnitude of said quantity, said motor comprising a first field coil and a second field coil, the relative phase of the currents in said first and second field coils determining the direction of rotation of said motor, a linear reactor having predetermined volt-ampere characteristics for varying frequencies of applied voltage, means connecting said linear reactor in series with said first field coil to form a first circuit, a saturable reactor having a reactance winding and a control winding, means connecting said reactance winding in series with said second field coil to form a second circuit, a source of alternating current for energizing said first and second circuits, means for impressing on said control winding a unidirectional voltage proportional to the magnitude of said quantity to cause the saturation of said saturable reactor to vary in response to variations in the magnitude of said quantity from said predetermined value, and means for adjusting the magnitude of said unidirectional voltage to cause said saturable reactor to have said predetermined volt-ampere characteristics when said quantity has said predetermined value.

4. In a system for maintaining a quantity substantially constant at a predetermined value, the combination of regulating means including a motor for controlling the magnitude of said quantity, said motor comprising a first field coil and a second field coil, the relative phase of the currents in said first and second field coils determining the direction of rotation of said motor, a first saturable reactor having a first reactance winding connected in circuit with said first field coil to form a first circuit, bias means for said first reactor, said first reactor having predetermined volt-ampere characteristics for varying frequencies of applied voltage, a second saturable reactor having a second reactance winding and a control winding, means connecting said second reactance winding in series with said second field coil to form a second circuit, a source of alternating current for energizing said first and second circuits, means for impressing on said control winding a unidirectional voltage proportional to the magnitude of said quantity to vary the saturation of said second reactor in response to variations in the magnitude of said quantity from said predetermined value, and means for adjusting the value of said unidirectional voltage to cause said second reactance winding to have said predetermined volt-ampere characteristics for varying frequencies of applied voltage when said quantity has said predetermined value.

5. In a system for maintaining a quantity substantially constant at a predetermined value, the combination of regulating means including a motor for controlling the magnitude of said quantity, said motor comprising a first field coil and a second field coil, the relative phase of the currents in said first and second field coils determining the direction of rotation of said motor, a first saturable reactor having a first reactance winding connected in circuit with said first field coil to form a first circuit, bias means for said first reactor, said first reactor having a predetermined linear volt-ampere characteristic, a second saturable reactor having a second reactance winding and a control winding, means connecting said second reactance winding in series with said second field coil to form a second circuit, a source of alternating current for energizing said first and second circuits, means for impressing on said control winding a unidirectional voltage proportional to the magnitude of said quantity to vary the saturation of said second reactor in response to variations in the magnitude of said quantity from said predetermined value, and means for adjusting the value of said unidirectional voltage to cause said second reactor to have said predetermined volt-ampere characteristic when said quantity has said predetermined value.

6. In a system for maintaining a quantity substantially constant at a predetermined value, the combination of regulating means including a motor for controlling the magnitude of said quantity, said motor comprising a first field coil and a second field coil, a first capacitor, a first saturable reactor having a first reactance winding connected in series with said first coil and said first capacitor to form a first circuit, bias means for said first reactor to cause said first reactor to have a predetermined linear volt-ampere characteristic, a second saturable reactor having a second reactance winding and a control winding, a second capacitor, means connecting said second reactance winding, said second capacitor and said second field coil in series to form a second circuit, a source of alternating current for energizing said first and said second circuits, the relative phase of the currents in said field coils determining the direction of rotation of said motor, means for impressing on said control winding a unidirectional voltage proportional to the magnitude of said quantity to cause the saturation of said second reactor to vary in response to variations in said quantity, and means for adjusting the value of said unidirectional voltage to cause said second reactor to have said predetermined volt-ampere characteristic when said quantity has said predetermined value.

7. In a system for maintaining a quantity substantially constant at a predetermined value, the combination of a direct current circuit for controlling the magnitude of said quantity, a motor for controlling the magnitude of the voltage of said direct current circuit, said motor comprising a first field coil and a second field coil, a reactor having a predetermined linear volt-ampere characteristic, means connecting said reactor in series with said first field coil to form a first circuit, a saturable reactor having a reactance winding and a control winding, means connecting said reactance winding in series with said second field coil to form a second circuit, a source of alternating current for energizing said first and second circuits, the relative phase of the currents in said first and second circuits determining the direction of rotation of said motor, means for impressing on said control winding a unidirectional voltage proportional to the magnitude of said quantity to vary the saturation of said saturable reactor in response to variations in said quantity from said predetermined value, means for adjusting the magnitude of said unidirectional voltage to cause said saturable reactor to have said predetermined volt-ampere characteristic when said quantity has said desired value, and a damping transformer having a primary winding connected to said direct current circuit and a secondary winding connected to said control winding to impress thereon a stabilizing voltage proportional to the rate of change of the voltage of said direct current circuit.

8. In a system for maintaining a quantity substantially constant at a predetermined value, the combination of a direct current circuit for controlling the magnitude of said quantity, a motor for controlling the magnitude of the voltage of said direct current circuit, said motor comprising a first field coil and a second field coil, a reactor having a predetermined volt-ampere characteristic, means connecting said reactor in series with said first field coil to form a first circuit, a saturable reactor having a reactance winding and a control winding, means connecting said reactance winding in series with said second field coil to form a second circuit, a source of alternating current for energizing said first and second circuits, the relative phase of the currents in said first and second circuits determining the direction of rotation of said motor, means for impressing on said control winding a unidirectional voltage proportional to the magnitude of said quantity to vary the saturation of said saturable reactor in response to variations in said quantity from said predetermined value, means for adjusting the magnitude of said unidirectional voltage to cause said saturable reactor to have said predetermined volt-ampere characteristic when said quantity has said desired value, and damping means connected to said direct current circuit and to said control winding for impressing on said control winding a stabilizing voltage proportional to the rate of change of the voltage of said direct current circuit.

9. In a system for maintaining a quantity substantially constant at a predetermined value, the combination of regulating means including a motor for controlling the magnitude of said quantity, said motor comprising a first field coil and a second field coil, a reactor having a volt-ampere characteristic which undergoes predetermined changes in response to variations in the frequency of the voltage applied to said reactor, a first capacitor, means connecting said reactor in series with said first capacitor and said first field coil to form a first circuit, a saturable reactor having a reactance winding and a control winding, a second capacitor, means connecting said reactance winding in series with said second capacitor and said second field coil to form a second circuit, a source of alternating current for energizing said first and second circuits, the relative phase of the currents in said first and second circuits determining the direction of rotation of said motor, means for impressing on said control winding a unidirectional voltage proportional to the magnitude of said quantity to vary the saturation of said saturable reactor in response to variations in said quantity, and means for adjusting the magnitude of said unidirectional voltage to cause the volt-ampere characteristic of said saturable reactor to undergo said predetermined changes in response to said variations in the frequency of the applied voltage when said quantity has said predetermined value.

DANIEL J. SIKORRA.

References Cited in the file of this patent

UNITED STATES PATENTS

| Number | Name | Date |
|---|---|---|
| 1,841,082 | Biggs | Jan. 12, 1932 |
| 2,399,872 | Krussmann | May 7, 1946 |
| 2,414,569 | Tubbs | Jan. 21, 1947 |
| 2,473,791 | Doremus | June 21, 1949 |
| 2,477,728 | Fitzgerald | Aug. 2, 1949 |
| 2,504,909 | Tubbs | Apr. 18, 1950 |